US011719509B2

(12) United States Patent
De Sarran et al.

(10) Patent No.: US 11,719,509 B2
(45) Date of Patent: Aug. 8, 2023

(54) PROJECTILE LAUNCH DETECTOR, AND ASSOCIATED PROJECTILE AND LAUNCHER ASSEMBLY

(71) Applicant: NAVAL GROUP, Paris (FR)

(72) Inventors: Thibaut De Sarran, Gassin (FR); Quentin Deguin, Gassin (FR); Pierre Nuytten, Gassin (FR)

(73) Assignee: NAVAL GROUP, Paris (FR)

(*) Notice: Subject to any disclaimer, the term of this patent is extended or adjusted under 35 U.S.C. 154(b) by 0 days.

(21) Appl. No.: 17/627,097

(22) PCT Filed: Jul. 17, 2020

(86) PCT No.: PCT/EP2020/070295
§ 371 (c)(1),
(2) Date: Jan. 13, 2022

(87) PCT Pub. No.: WO2021/009350
PCT Pub. Date: Jan. 21, 2021

(65) Prior Publication Data
US 2022/0252376 A1 Aug. 11, 2022

(30) Foreign Application Priority Data
Jul. 18, 2019 (FR) ..................... 19 08108

(51) Int. Cl.
*F41F 3/10* (2006.01)
*G01P 5/04* (2006.01)
(Continued)

(52) U.S. Cl.
CPC ................. *F41F 3/10* (2013.01); *B63G 8/32* (2013.01); *F42B 19/24* (2013.01); *F42B 19/06* (2013.01); *G01P 5/04* (2013.01)

(58) Field of Classification Search
CPC .... F41F 3/10; B63G 8/32; F42B 19/24; F42B 19/06; F42B 19/00; F42B 19/36; G01P 5/04; G01P 5/06
See application file for complete search history.

(56) References Cited

U.S. PATENT DOCUMENTS 2,342,523 A 2/1944 George
5,211,358 A * 5/1993 Bagley .................... F42B 10/20
244/49

(Continued)

FOREIGN PATENT DOCUMENTS

FR 802587 A 9/1936
JP S58112893 A 7/1983
SE 335487 B 5/1971

OTHER PUBLICATIONS

International Search Report issued in International Application No. PCT/EP2020/070295, dated Nov. 19, 2020.

*Primary Examiner* — Andrew Polay
(74) *Attorney, Agent, or Firm* — Knobbe, Martens, Olson & Bear, LLP

(57) ABSTRACT

A projectile launch detector, including a body, a mast and a blade rigidly connected to the mast; the mast being capable of sliding between a retracted configuration and a deployed configuration, and capable of pivoting between a first and a second angular position. The detector may further includes a first elastic return element to return the mast to the deployed configuration relative to the body; and a first associated sensor; and a second elastic return element to return the mast to the first angular position relative to the body; and a second associated sensor.

11 Claims, 4 Drawing Sheets

(51) Int. Cl.
*B63G 8/32* (2006.01)
*F42B 19/24* (2006.01)
*F42B 19/06* (2006.01)

(56) References Cited

U.S. PATENT DOCUMENTS

| | | | |
|---|---|---|---|
| 5,343,743 A * | 9/1994 | Chapman | G01P 5/04 |
| | | | 73/170.05 |
| 9,086,258 B1 * | 7/2015 | Vasudevan | F42B 30/10 |
| 10,191,076 B1 * | 1/2019 | Wang | G01H 11/08 |
| 2014/0260596 A1 * | 9/2014 | Kubicek | G01P 5/02 |
| | | | 73/170.16 |
| 2018/0003733 A1 * | 1/2018 | Peinke | G01F 1/28 |
| 2021/0131776 A1 * | 5/2021 | Scott | F42B 10/14 |

* cited by examiner

PROJECTILE LAUNCH DETECTOR, AND ASSOCIATED PROJECTILE AND LAUNCHER ASSEMBLY

BACKGROUND

Field

The present invention relates to a projectile launch detector, in particular in an underwater environment.

Conventionally, for security reasons, underwater projectiles of the torpedo type are launched while their propulsion system is stopped. Initiating propulsion therefore requires that the launch of said torpedo be detected.

Description of the Related Art

Furthermore, certain types of underwater projectiles are recovered at sea after a mission. In order to allow operators to approach them without danger, it is useful to determine whether the speed of the projectile is above or below a specific speed.

The present invention aims to provide a projectile launch detector making it possible to meet these needs, without disrupting the usual operation of the corresponding projectile.

SUMMARY

To this end, the invention relates to a projectile launch detector, comprising: a body arranged along a first axis; a mast extending along the first axis, said mast comprising a first and a second end, respectively arranged inside and outside the body; and a blade secured to the second end of the mast and extending radially relative to said mast, said blade including: first and second opposite faces, parallel to the first axis; and an end surface, substantially perpendicular to the first axis and opposite the body. The mast is able to slide relative to the body along the first axis, between a retracted configuration and a deployed configuration, the blade being axially closer to the body in the retracted configuration than in the deployed configuration. The mast is further able to pivot relative to the body about the first axis, between a first and a second angular position. The detector further comprises: a first elastic return element, to return the mast to the deployed configuration relative to the body; a first sensor, able to determine whether the mast is in the retracted configuration or in the deployed configuration; a second elastic return element, to return the mast to the first angular position relative to the body; and a second sensor, able to determine whether the mast is in the first or the second angular position.

According to other advantageous aspects of the invention, the launch detector includes one or more of the following features, considered alone or according to all technically possible combinations:

the first elastic return element is a compression spring;
the second elastic return element is a torsion spring;
the first and second faces of the blade form a non-zero angle and preferably an angle of less than or equal to 25°.

The invention further relates to a projectile extending along a second axis and comprising: an outer lateral surface, substantially parallel to said second axis; a propulsion element along a movement direction parallel to said second axis; and an electronic command and control module, connected to said propulsion element. Said projectile further comprises a launch detector as described above, the body of said detector being stationary relative to the outer lateral surface of said projectile, the first axis being substantially perpendicular to the second axis; the first and second sensors of the launch detector being connected to the electronic module. The launch detector is configured such that in the deployed configuration of the mast, the end surface of the blade forms a protrusion relative to the outer lateral surface of the projectile.

According to other advantageous aspects of the invention, the projectile includes one or more of the following features, considered alone or according to all technically possible combinations:

the launch detector is configured such that in the first angular position of the mast, the first face of the blade is substantially perpendicular to the second axis and oriented toward the front, along the movement direction;

the projectile comprises: a casing extending along the second axis; and an aileron extending radially relative to a rear end of said casing; the casing and/or the aileron comprising the outer lateral surface; said projectile being able to move in an underwater environment;

the body of the launch detector is inserted into the casing and the second end of the mast is able to slide in an inner cavity of the aileron between the retracted and deployed configurations.

The invention further relates to a launcher assembly comprising: a projectile as described above; and a launching tube comprising an inner chamber able to contain said projectile; the inner chamber comprising an inner surface configured such that, when the projectile is received in the inner chamber, the end surface of the blade of the launch detector is in contact with said inner surface, the mast of the launch detector thus being kept in the retracted configuration.

The invention further relates to a method for implementing the launcher assembly described above, comprising the following steps: ejecting the projectile from the launching tube; sliding the mast of the launch detector into the deployed configuration; detecting said sliding via the first sensor and sending a corresponding signal to the electronic module; initiating the propulsion element via the electronic module.

The invention further relates to an operating method of the projectile described above, comprising the following steps: initiating the propulsion element via the electronic module; if the mast reaches the second angular position relative to the body, detection via the second sensor and sending a corresponding signal to the electronic module; then, if the mast returns to the first angular position relative to the body, detection via the second sensor and sending a corresponding signal to the electronic module.

BRIEF DESCRIPTION OF THE DRAWINGS

The invention will be better understood upon reading the following description, provided solely as a non-limiting example and done in reference to the drawings, in which.

DETAILED DESCRIPTION

Figure 1:
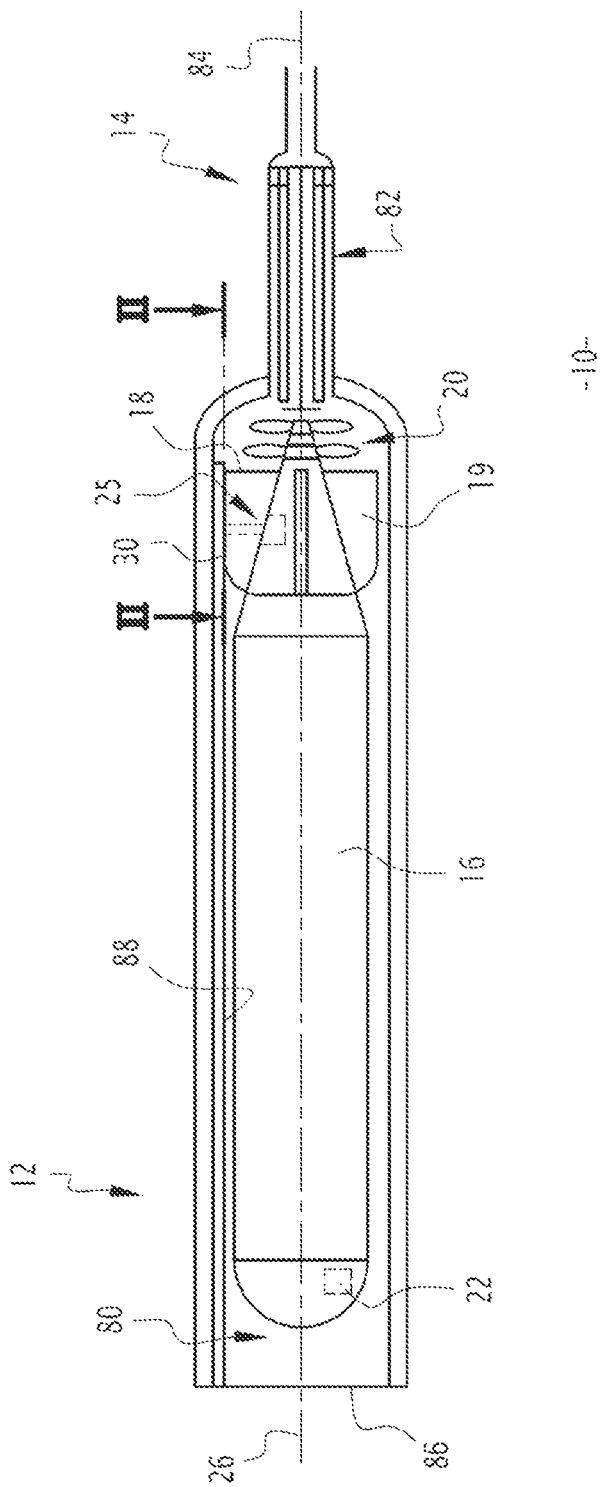
FIG. 1 is a schematic partial sectional view of a launcher assembly comprising a projectile according to one embodiment of the invention.

FIG. 1 shows a launcher assembly 10 according to one embodiment of the invention. The launcher assembly 10 is in particular intended to equip a vessel, such as a surface ship or a submarine.

The launcher assembly 10 is in particular intended to launch a projectile 12 in an underwater environment. The launcher assembly 10 includes the projectile 12 and a launching tube 14.

The projectile 12, for example a torpedo, is able to move in the underwater environment. The projectile 12 in particular includes a casing 16, one or several ailerons 18, 19 and a propulsion element 20.

The projectile 12 also includes an integrated command and control system, such as an electronic module 22. The electronic module 22 is preferably able to communicate with a control station (not shown), in particular by radio link. Said control station is for example located in the vessel equipped with the launcher assembly 10.

The projectile 12 further includes a launch detector 25, which will be described later.

The casing 16 has a longitudinal shape extending along a movement axis 26 of the projectile 12. The propulsion element 20 is able to move the projectile 12 along said axis 26, in a movement direction. The propulsion element 20 is arranged behind the casing 16 along said movement direction.

Preferably, the propulsion element 20 comprises at least one propeller able to move the projectile in an underwater environment, as well as a motor able to rotate the at least one propeller. Said motor is connected to the electronic module 22.

In the illustrated embodiment, the projectile 12 includes several ailerons 18, 19 fastened to the rear of the casing 16 and evenly distributed about the movement axis 26. Each aileron 18, 19 forms a radial protrusion relative to the casing 16.

The projectile 12 includes an outer lateral surface 30 able to cooperate with the launching tube 14, as will be described hereinafter. The outer lateral surface is in particular formed by the casing 16 and/or the ailerons 18, 19. "Lateral" means that said outer lateral surface 30 is substantially parallel to the movement axis 26.

In the illustrated embodiment, said outer lateral surface is formed by a lateral edge 30 of an aileron 18. Said lateral edge is substantially planar and oriented away from the movement axis 26.

The launch detector 25 of the projectile 12, visible in FIGS. 2 and 3, will now be described.

The launch detector 25 extends along a main axis 40 and in particular comprises a body 42, a mast 44 and a blade 46.

The detector 25 further comprises: a first elastic return element 48 and an associated first sensor 50, as well as a second elastic return element 52 and an associated second sensor 54.

The body 42 is hollow, with a substantially cylindrical shape. The mast 44 extends along the main axis 40 between a first 56 and a second end, respectively arranged inside and outside the body 42.

Figure 2:
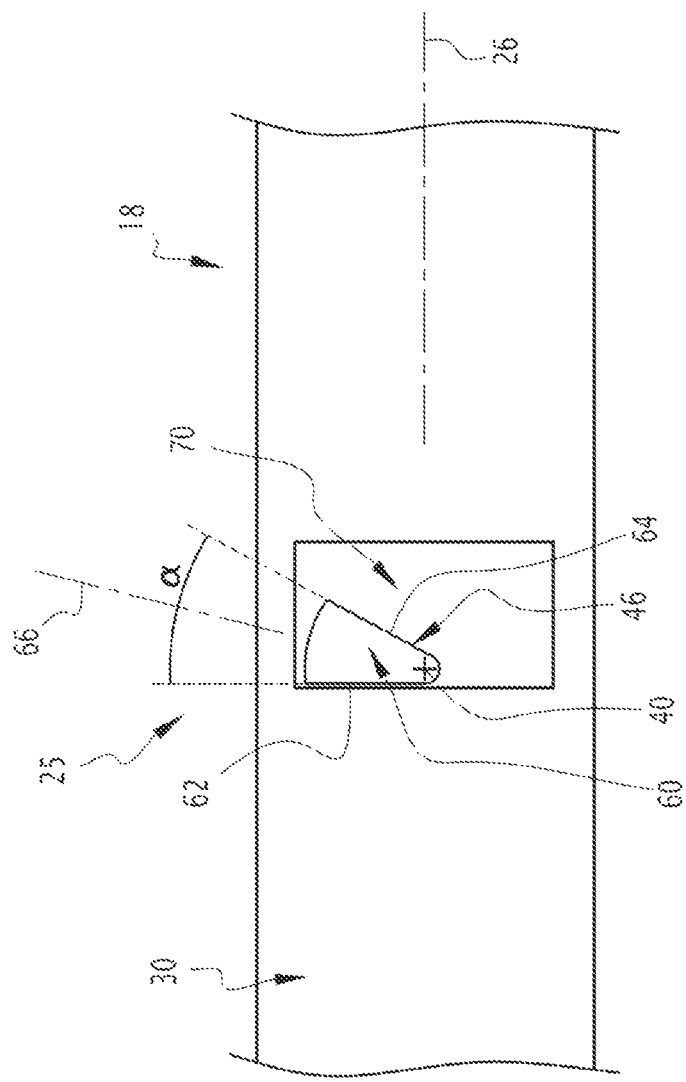
FIG. 2 is a schematic partial sectional view of the assembly of FIG. 1 with the projectile in a first configuration.
Figure 3:
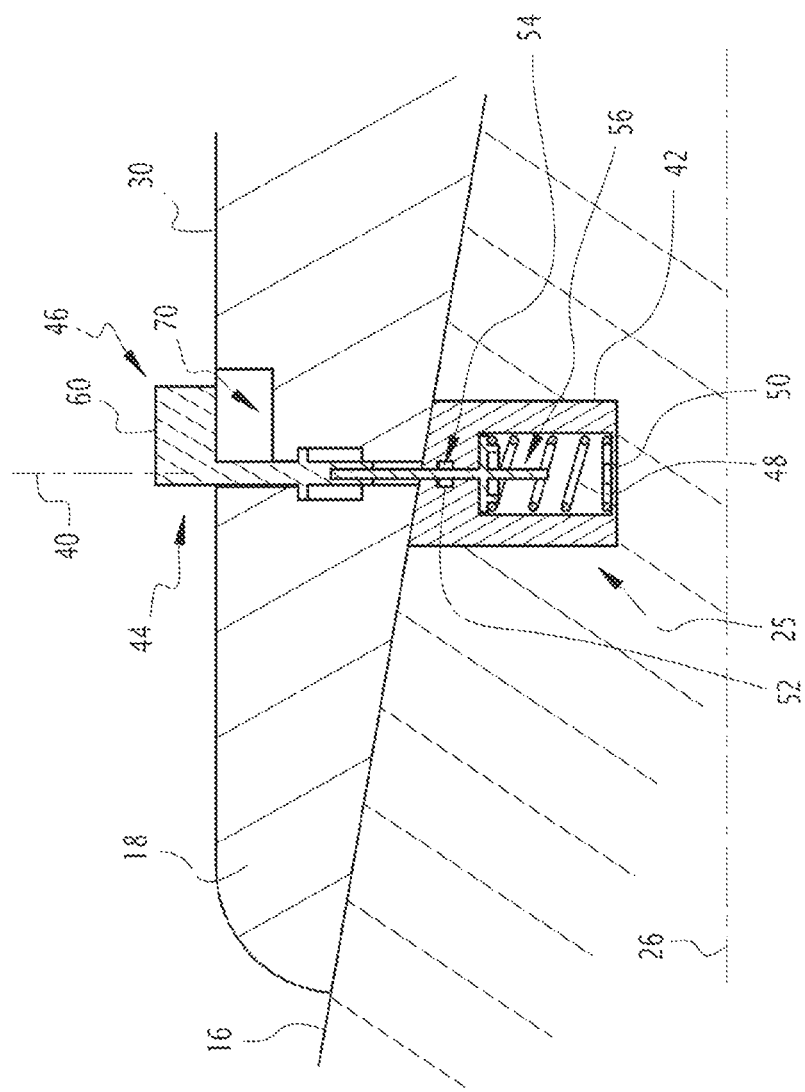
FIG. 3 is a schematic partial sectional view of the projectile of FIGS. 1 and 2 in a second configuration.

The first end 56 of the mast 44 is able to slide inside the body 42 along the main axis 40, between a retracted configuration, visible in FIG. 2, and a deployed configuration, visible in FIG. 3. In the retracted configuration, the second end of the mast 44 is axially closer to the body 42 than in the deployed configuration.

The first elastic return element 48 exerts an axial force on the mast 44, returning said mast 44 to the deployed configuration relative to the body 42. The first elastic return element 48 is for example a helical compression spring, received inside the body 42.

The blade 46 is secured to the second end of the mast 44 and arranged outside the body 42. The blade 46 extends radially relative to the mast 44.

The blade 46 comprises: an end surface 60, which is substantially planar and perpendicular to the main axis 40; and a first 62 and a second 64 lateral face, which are parallel to the main axis 40. The end surface 60 is oriented away from the body 42.

In the illustrated embodiment, as shown in FIG. 2, the end surface 60 is substantially in the shape of a disc portion and the first 62 and second 64 lateral faces form a non-zero angle α. Preferably, the angle α is less than 25° and more preferably between 15° and 20°.

FIG. 2 shows a median plane 66 of the blade 46, passing through the main axis 40 equidistant from the first 62 and second 64 lateral faces.

According to a variant that is not shown, the first and second lateral faces of the blade are substantially parallel.

The mast 44 and the blade 46 are able to pivot relative to the body 42 about the main axis 40, between a first angular position, visible in FIG. 2, and a second angular position, visible in FIG. 3.

The second elastic return element 52 exerts a torque on the mast 44, returning said mast to the first angular position relative to the body. The second elastic return element 52 is for example a torsion spring, received inside the body 42.

The elastic return elements allow a reversible device to be obtained. Thus, the launch detector 25 can be re-armed and used several times, as can the projectile 12.

The first 50 and second 54 sensors are connected to the electronic module 22 of the projectile 12. The first sensor 50 is able to determine whether the mast 44 is in the retracted configuration and/or whether the mast 44 is in the deployed configuration. The second sensor 54 is able to determine whether the mast 44 and the blade 46 are in the first angular position, and/or whether the mast 44 and the blade 46 are in the second angular position. The first 50 and second 54 sensors are for example mechanical all-or-nothing sensors.

As shown in FIG. 3, the body 42 of the detector 25 is housed inside the casing 16 of the projectile 12, the main axis 40 of said detector being arranged perpendicular to the movement axis 26 of said projectile 12.

Furthermore, the mast 44 of the detector 25 is able to slide in a cavity 70 arranged inside the aileron 18 of the projectile 12, said aileron 18 comprising the lateral edge 30 described above. The cavity 70 opens on said lateral edge 30.

In the retracted configuration of the mast 44, the blade 46 is completely received in the cavity 70 and the end surface 60 of said blade is flush with the lateral edge 30 of the aileron 18. In the deployed configuration of the mast 44, as shown in FIG. 3, the blade 46 forms a protrusion along the main axis 40 relative to said lateral edge 30.

In the first angular position of the blade 46, as visible in FIG. 2, the first lateral face 62 of said blade is substantially perpendicular to the movement axis 26 and oriented toward the front of the projectile 12. In the second angular position of the blade 46, as visible in FIG. 3, the blade is substantially oriented toward the rear of the projectile 12, the median plane 66 of said blade being substantially parallel to the movement axis 26.

The launching tube 14 of the launcher assembly 10 will now be described.

The launching tube 14 comprises an inner chamber 80 and a launching device 82. The inner chamber 80, able to contain the projectile 12, has an elongated shape along an axis 84 and includes an opening 86 at one end. The launching device 82, arranged at the other end of the inner chamber 80, is able to eject the projectile 12 from the launching tube through the opening 86. The launching device 82 for example includes a pneumatic rammer, as described in document WO2017162602.

FIG. 1 shows the launcher assembly 10 in an initial configuration, in which the projectile 12 is received in the inner chamber 80.

The inner chamber 80 comprises an inner surface configured such that, in the initial configuration, said inner surface is in contact with the end surface 60 of the blade 46 of the launch detector 25.

In the illustrated embodiment, said inner surface of the inner chamber 80 comprises at least one guide rail 88, extending along the axis 84 of the inner chamber 80. In the initial configuration, the mast 44 of the detector 25 is in the retracted configuration; the guide rail 88 is in contact with the end surface 60 of the blade 46, as well as the lateral edge 30 of the aileron 18 receiving said blade.

Figure 4:
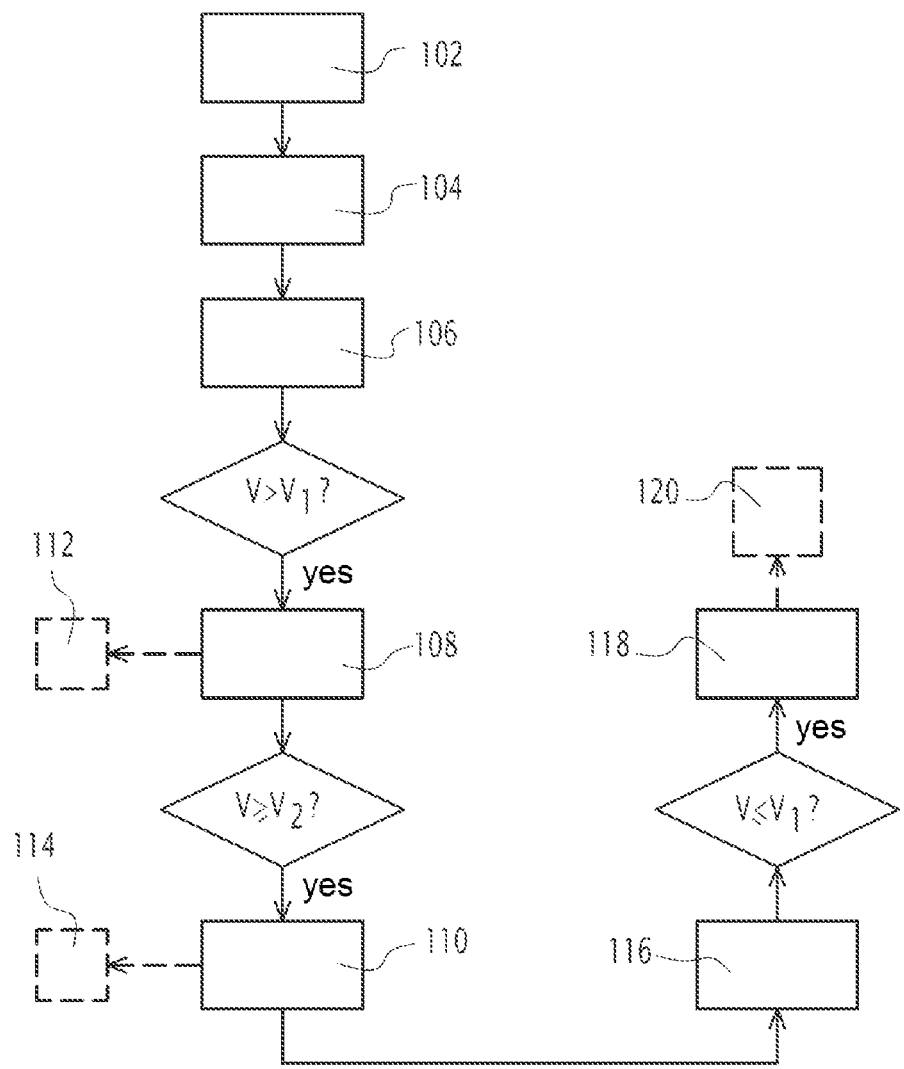
FIG. 4 is a flowchart showing a method for implementing the launcher assembly and the projectile of FIG. 1, according to one embodiment.

A method 100 for implementing the above launcher assembly 10 will now be described. Said method 100 is shown schematically in FIG. 4.

In an initial state of the method 100, the launcher assembly 10, for example equipping a submarine, is in a submerged environment. In particular, the launching tube 14 is arranged underwater, the inner chamber 80 is filled with water and the opening 86 for example opens under the surface of the sea. Furthermore, the projectile 12 is received in the launching tube 14, in the initial configuration previously described. The motor of the propulsion element 20 of said projectile is stopped.

In a first step 102 of the method, the launching device 82 of the launching tube 14 ejects the projectile 12 outside the inner chamber 80, through the opening 86. The first step 102 is for example initiated by the control station of the projectile 12.

The aileron 18 having left the inner chamber 80, the upper surface 60 of the blade 46 of the detector 25 is no longer in contact with the guide rail 88. The first elastic return element 48 relaxes, causing the mast 44 to go from the retracted configuration to the deployed configuration.

The following steps of the method correspond to a program executed by the electronic module 22 of the projectile 12.

The mast 44 being in the deployed configuration, the first sensor 50 sends the electronic module 22 a corresponding signal (step 104), indicating the ejection of the projectile 12. Said electronic module 22 then starts the motor of the propulsion element 20 (step 106), leading to the underwater movement of the projectile 12 along the movement axis 26.

The water passed through by the projectile 12 exerts a force on the blade 46 oriented toward the rear of said projectile along the movement axis 26. This force counters the torque exerted by the second elastic return element 52.

Past a first threshold speed, denoted $V_1$, of the projectile 12, the force exerted on the first lateral face 62 of the blade 46 causes said first lateral face 62 to pivot, the blade 46 then moving away from the first angular position. Preferably, the detector 25 is configured so that the first threshold speed $V_1$ is of the order of 5 km/h.

According to one embodiment, when the blade 46 moves away from said first angular position, the second sensor 52 sends the electronic module 22 a first warning signal (step 108).

Moreover, past a second threshold speed, greater than $V_1$ and denoted $V_2$, the force exerted on the first lateral face 62 is such that the blade 46 reaches the second angular position of FIG. 3. The second angular position is an equilibrium position, in which the flows along the first 62 and second 64 lateral faces of the blade exert forces that offset one another perpendicular to the movement axis 26. In said second angular position, the median plane 66 of the blade 46 is substantially coplanar with the movement axis 26. Preferably, the detector 25 is configured so that the second threshold speed $V_2$ is of the order of 15 km/h.

According to one embodiment, when the blade 46 reaches the second angular position, the second sensor 52 sends the electronic module 22 a second warning signal (step 110).

The electronic module 22 is thus able to relay information to the control station according to which the first $V_1$ and/or the second $V_2$ threshold speed is reached by the projectile 12 (steps 112, 114). The proper operation of the projectile 12 is thus verified.

In particular, the information according to which the second speed $V_2$ is reached makes it possible to confirm that the propulsion of the projectile 12 is correctly activated and that the projectile 12 has freed the space in front of the launching tube 14, and in general, in front of the vessel.

The configuration of the detector 25 favors the laminar flow along the blade 46 in the deployed configuration, as well as on the aileron 18. The presence of the detector 25 therefore minimizes the cavitation phenomena and does not risk disrupting the movement of the projectile 12, in particular the operation of the propellers. Likewise, the presence and the movements of the detector 25 generate little parasitic noise during the movement of the projectile 12.

In a following step of the method, corresponding to an end of mission of the projectile 12, the electronic module 22 stops the motor of the propulsion element 20 (step 116). The projectile 12 slows down, which decreases the flow of water on the blade 46. Said blade therefore gradually returns to the first angular position.

The second sensor 52 then sends the electronic module 22 a new signal (step 118) indicating that the speed of the projectile 12 is less than the first threshold speed $V_1$.

Preferably, the blade 46 and the second elastic return element 52 are configured such that the first threshold speed $V_1$ corresponds to a threshold below which operators can approach the projectile 12 without danger to recover it in the water.

Following step 118, the electronic module 22 is therefore able to notify the control station of the end of mission of the projectile 12 (step 120), so that this projectile can be recovered at sea.

In one particular embodiment, when the second sensor 52 sends a signal indicating that the speed of the projectile 12 is less than the first threshold speed $V_1$, the electronic module 22 triggers a location beacon (not shown) allowing recovery of the projectile 12 to be facilitated.

What is claimed is:
1. A projectile launch detector, comprising:
a body arranged along a first axis;

a mast extending along the first axis, said mast comprising a first and a second end, respectively arranged inside and outside the body; and a blade secured to the second end of the mast and extending radially relative to said mast, said blade including: first and second opposite faces, parallel to the first axis; and an end surface, substantially perpendicular to the first axis and opposite the body;

the mast configured to slide relative to the body along the first axis, between a retracted configuration and a deployed configuration, the blade being axially closer to the body in the retracted configuration than in the deployed configuration;

the mast further configured to pivot relative to the body about the first axis, between a first and a second angular position; and the detector further comprising:

a first elastic return element, configured to return said mast to the deployed configuration relative to the body;

a first sensor configured to determine whether the mast is in the retracted configuration or in the deployed configuration;

a second elastic return element, configured to return said mast to the first angular position relative to the body; and a second sensor configured to determine whether the mast is in the first or the second angular position.

2. The launch detector according to claim 1, wherein the first elastic return element is a compression spring.

3. The launch detector according to claim 1, wherein the second elastic return element is a torsion spring.

4. The launch detector according to claim 1, wherein the first and second faces of the blade form a non-zero angle and preferably an angle of less than or equal to 25°.

5. A projectile extending along a second axis and comprising: an outer lateral surface, substantially parallel to said second axis; a propulsion element along a movement direction parallel to said second axis; and an electronic command and control module, connected to said propulsion element;

said projectile further comprising a launch detector according to claim 1, the body of said detector being stationary relative to the outer lateral surface of said projectile, the first axis being substantially perpendicular to the second axis;

the first and second sensors of said launch detector being connected to the electronic module; and the launch detector being configured such that in the deployed configuration of the mast (44), the end surface of the blade forms a protrusion relative to the outer lateral surface (30) of the projectile.

6. The projectile according to claim 5, wherein the launch detector is configured such that in the first angular position of the mast, the first face of the blade is substantially perpendicular to the second axis and oriented toward the front, along the movement direction.

7. The projectile according to claim 5, comprising: a casing extending along the second axis; and an aileron extending radially relative to a rear end of said casing; at least one of the casing or the aileron comprising the outer lateral surface; said projectile being able to move in an underwater environment.

8. The projectile according to claim 7, wherein the body of the launch detector is inserted into the casing and the second end of the mast configured to slide in an inner cavity of the aileron between the retracted and deployed configurations.

9. A launcher assembly comprising: a projectile according to claim 5; and a launching tube comprising an inner chamber able to contain said projectile; the inner chamber comprising an inner surface configured such that, when the projectile is received in the inner chamber, the end surface of the blade of the launch detector is in contact with said inner surface, the mast of the launch detector thus being kept in the retracted configuration.

10. A method for implementing the launcher assembly according to claim 9, said method comprising:

ejecting the projectile from the launching tube;

sliding the mast the launch detector into the deployed configuration;

detecting said sliding via the first sensor (50) and sending a corresponding signal to the electronic module; and initiating the propulsion element via the electronic module.

11. An operating method of a projectile according claim 5, said method comprising:

initiating the propulsion element via the electronic module;

when the mast reaches the second angular position relative to the body, detecting via the second sensor and sending a corresponding signal to the electronic module, and when the mast returns to the first angular position relative to the body, detecting via the second sensor and sending a corresponding signal to the electronic module.

* * * * *